US012798021B2

(12) United States Patent
Inoue

(10) Patent No.: US 12,798,021 B2
(45) Date of Patent: Nov. 17, 2026

(54) WELDING JIG DEVICE

(71) Applicant: NOK CORPORATION, Tokyo (JP)

(72) Inventor: Junpei Inoue, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 759 days.

(21) Appl. No.: 18/037,411

(22) PCT Filed: Sep. 24, 2021

(86) PCT No.: PCT/JP2021/034971
§ 371 (c)(1),
(2) Date: May 17, 2023

(87) PCT Pub. No.: WO2022/107445
PCT Pub. Date: May 27, 2022

(65) Prior Publication Data

US 2023/0415279 A1 Dec. 28, 2023

(30) Foreign Application Priority Data

Nov. 18, 2020 (JP) ................................ 2020-191837

(51) Int. Cl.
*B23K 37/04* (2006.01)
*B23K 26/21* (2014.01)

(52) U.S. Cl.
CPC .......... *B23K 37/0443* (2013.01); *B23K 26/21* (2015.10)

(58) Field of Classification Search
CPC ................ B23K 37/04; B23K 37/0408; B23K 37/0435; B23K 37/0443; B23K 26/21
See application file for complete search history.

(56) References Cited

U.S. PATENT DOCUMENTS 4,847,467 A * 7/1989 Ausilio .............. B23K 37/0435 219/161
2005/0045693 A1* 3/2005 Buchheit ............ B23K 37/0408 228/112.1

(Continued)

FOREIGN PATENT DOCUMENTS

CN 111566392 8/2020
JP 2011-161450 8/2011

(Continued)

OTHER PUBLICATIONS

Chinese Office Action received in CN Patent Application No. 202180070632.3, dated Apr. 27, 2025, and English language translation thereof.

(Continued)

*Primary Examiner* — Justin C Dodson
(74) *Attorney, Agent, or Firm* — GREENBLUM & BERNSTEIN, P.L.C.

(57) ABSTRACT

A welding jig device includes a jig on one side, a jig on the other side, and a jig clamp. The jig on one side includes a joint face on one side that contacts one face of faces exposed on outer surface sides of a plurality of workpieces that are overlaid one on top of the other. The jig on the other side includes a joint face on the other side that contacts the other face of the faces exposed on the outer surface sides of the plurality of workpieces. An opening corresponding to a desired welded portion of the plurality of workpieces is provided in at least one of the jig on one side or the jig on the other side. The jig clamp sandwiches the jig on one side and the jig on the other side together with the plurality of workpieces in a stacking direction of the plurality of workpieces.

6 Claims, 11 Drawing Sheets

(56) References Cited

U.S. PATENT DOCUMENTS

| | | | | |
|---|---|---|---|---|
| 2020/0139486 | A1* | 5/2020 | Shimazoe .......... | B23K 37/0531 |
| 2021/0039205 | A1 | 2/2021 | Masaka et al. | |
| 2022/0134491 | A1 | 5/2022 | Inoue et al. | |

FOREIGN PATENT DOCUMENTS

| | | |
|---|---|---|
| JP | 2014-194876 | 10/2014 |
| KR | 20170092223 | 8/2017 |
| WO | 2016/001992 | 7/2016 |
| WO | 2020/184276 | 9/2020 |

OTHER PUBLICATIONS

Notice of Reasons for Refusal received in Japanese Patent Application No. 2022-563600, dated Jan. 4, 2024.

Chinese Office Action received in CN Patent Application No. 202180070632.2, dated Apr. 27, 2025, and English language translation thereof.

German Office Action received in DE Patent Application No. 112021006015.5, dated Sep. 1, 2025, and English language translation thereof.

International Search Report issued in International Bureau of WIPO Patent Application No. PCT/JP2021/034971, dated Nov. 30, 2021.

Written Opinion issued in International Bureau of WIPO Patent Application No. PCT/JP2021/034971, dated Nov. 30, 2021.

International Preliminary Report on Patentability issued in International Bureau of WIPO Patent Application No. PCT/JP2021/034971, dated May 16, 2023.

* cited by examiner

WELDING JIG DEVICE

CROSS REFERENCE TO RELATED APPLICATIONS

This is the U.S. National Stage of International Application No. PCT/JP2021/034971, filed Sep. 24, 2021, which claims the benefit of Japanese Patent Application No. 2020-191837, filed Nov. 18, 2020, the disclosure of which is hereby incorporated by reference in its entirety.

TECHNICAL FIELD

The present disclosure relates to a welding jig device.

BACKGROUND ART

Conventionally, there is known a part formed by joining a plurality of plate-like metal members by welding (hereinafter also simply referred to as a "part"), such as a fuel cell that is a part for a fuel cell device. For a part such as a fuel cell, not only the members to be joined, but also a circulation path for a reactant gas within the part is formed by welding. The circulation path is formed in a closed circuit form by welding around through-holes that are provided in the members so that airtightness is secured.

As a technique for forming a part, which has a closed circuit formed therein, by welding a plurality of metal members together as described above, there is known a welding jig device or a method for producing fuel cell-related parts, for example (see Patent Literatures 1 and 2, for example). Patent Literatures 1 and 2 each disclose a welding jig device with openings that are provided corresponding to the portions to be welded, for specifying the portions to be welded.

DOCUMENT LIST

Patent Literatures

Patent Literature 1: Japanese Patent Application Publication No. 2014-194876

Patent Literature 2: Japanese Patent Application Publication No. 2011-161450

SUMMARY OF INVENTION

Technical Problem

By the way, welding of plate-like members (hereinafter referred to as "workpieces") that constitute a fuel cell is performed by the following procedures, for example. First, the workpieces are overlaid one on top of the other and sandwiched by a jig. The workpieces are irradiated with a laser beam from a slit provided in the jig and welded while being tightly held together by the jig.

However, when the force to overlay the workpieces together with the jig is insufficient, gaps have sometimes been generated due to distortion of workpieces generated in welding in conventional welding jig devices. Therefore, a further improvement of the jig devices for use in welding plate-like workpieces is required to appropriately perform welding.

The present disclosure has been made in view of the foregoing problems, and it is an object of the present disclosure to provide a welding jig device capable of appropriately performing welding.

Solution to Problem

To achieve the aforementioned object, a welding jig device according to the present disclosure is a jig device used for forming a part by overlaying a plurality of members one on top of the other and welding the plurality of members together, and includes a jig on one side including a joint face on one side, the joint face on one side being adapted to contact one face of faces exposed on outer surface sides of the plurality of members that are overlaid one on top of the other, a jig on the other side including a joint face on the other side, the joint face on the other side being adapted to contact the other face of the faces exposed on the outer surface sides of the plurality of members, and a jig clamp adapted to sandwich the jig on one side and the jig on the other side together with the plurality of members in a stacking direction of the plurality of members, in which an opening corresponding to desired welded portions of the part is provided in at least one of the jig on one side or the jig on the other side.

In the welding jig device according to an aspect of the present disclosure, the jig clamp includes a clamp member on one side that contacts a face on an outer surface side of the jig on one side, and a clamp member on the other side that contacts a face on an outer surface side of the jig on the other side.

In the welding jig device according to an aspect of the present disclosure, pressurizing parts are provided on an outer periphery side of the plurality of members in a surface direction, the pressurizing parts being adapted to pressurize the jig on one side and the jig on the other side from the outer surface side in the stacking direction.

In the welding jig device according to an aspect of the present disclosure, spacers are provided at positions of the pressurizing parts in the surface direction and between the jig on one side and the jig on the other side in the stacking direction.

In the welding jig device according to an aspect of the present disclosure, the opening on one side of the jig on one side corresponds to a portion of the desired welded portions of the part, and the jig on the other side includes an opening on the other side in a portion not corresponding to the opening on one side of the desired welded portions of the part.

In the welding jig device according to an aspect of the present disclosure, the desired welded portions that are formed through the opening on one side and the opening on the other side form annular closed paths.

In the welding jig device according to an aspect of the present disclosure, the jig clamp contacts faces on the outer surface sides of the jig on one side and the jig on the other side at positions where at least one of the opening on one side or the opening on the other side is not provided.

Effects of Disclosure

According to a welding jig device of the present disclosure, proper welding can be realized.

DESCRIPTION OF EMBODIMENTS

Hereinafter, an embodiment of the present disclosure will be described with reference to the drawings.

Hereinafter, an embodiment of the present disclosure will be described with reference to the drawings. The following embodiment will describe an example in which a welding jig device according to the present disclosure is used for a method for producing a fuel cell as an example of a part produced by overlaying a plurality of metal members one on top of the other and joining them.

Figure 1:
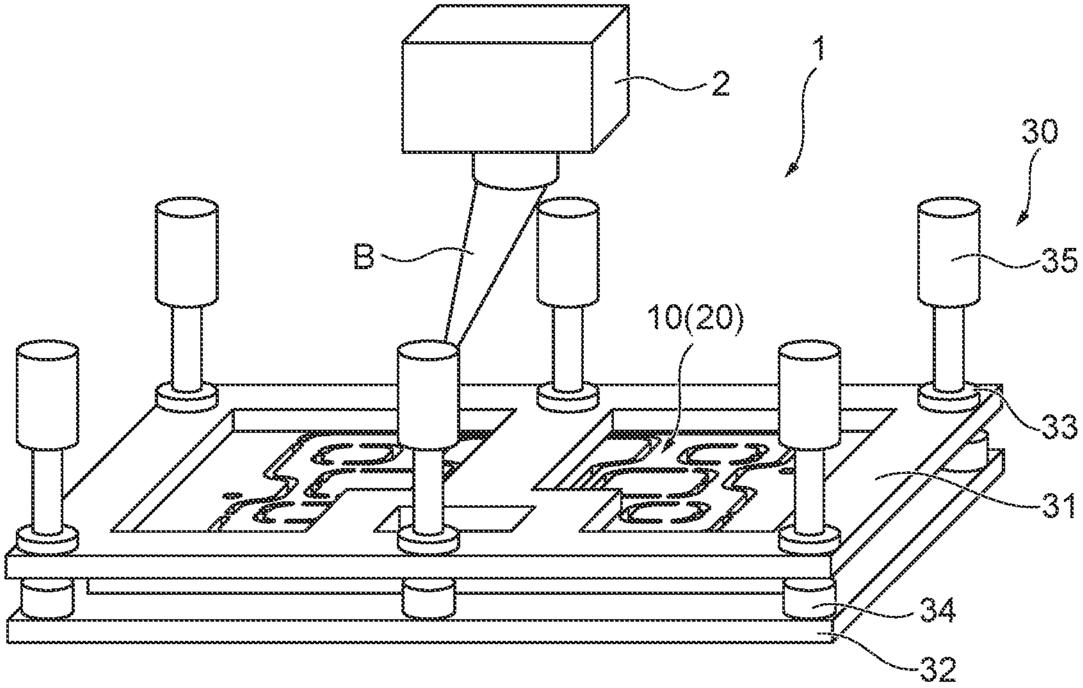
FIG. 1 A schematic view for illustrating the schematic configuration of a welding jig device according to an embodiment of the present disclosure.
Figure 2:
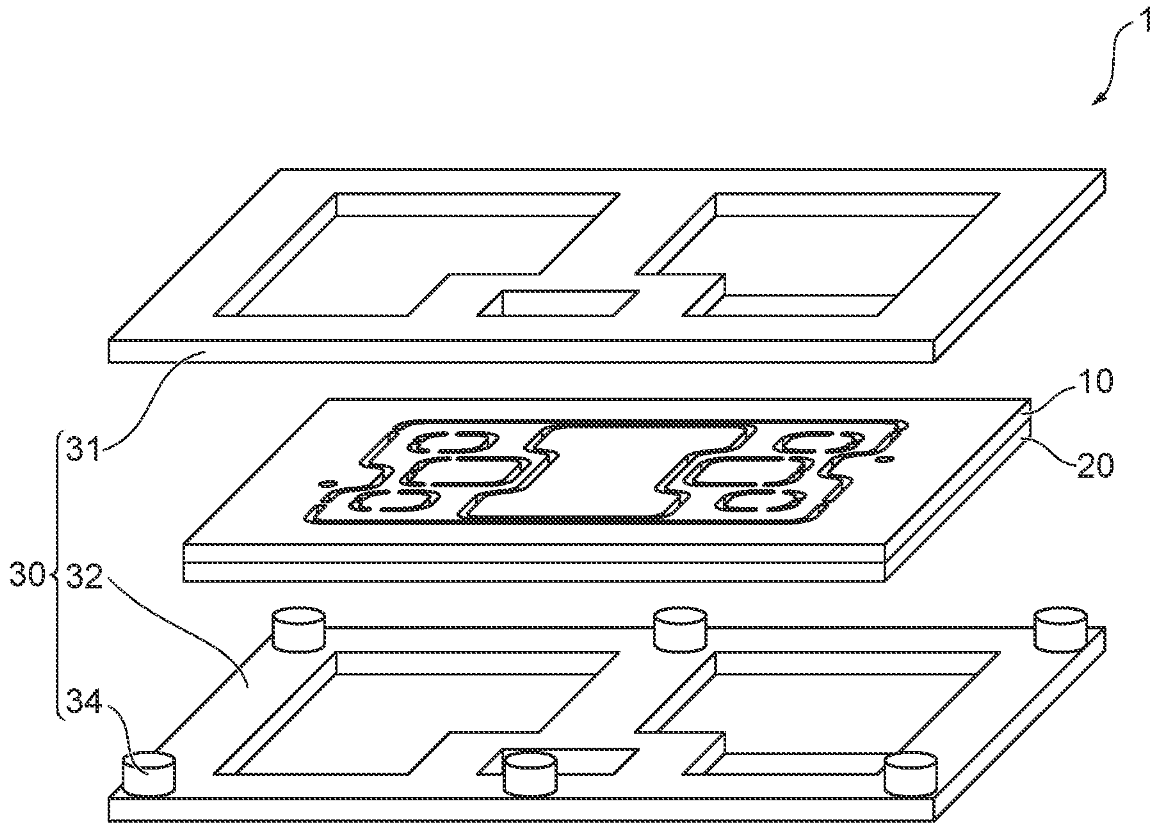
FIG. 2 An exploded perspective view for illustrating the schematic configuration of the welding jig device illustrated in FIG. 1.
Figure 3:
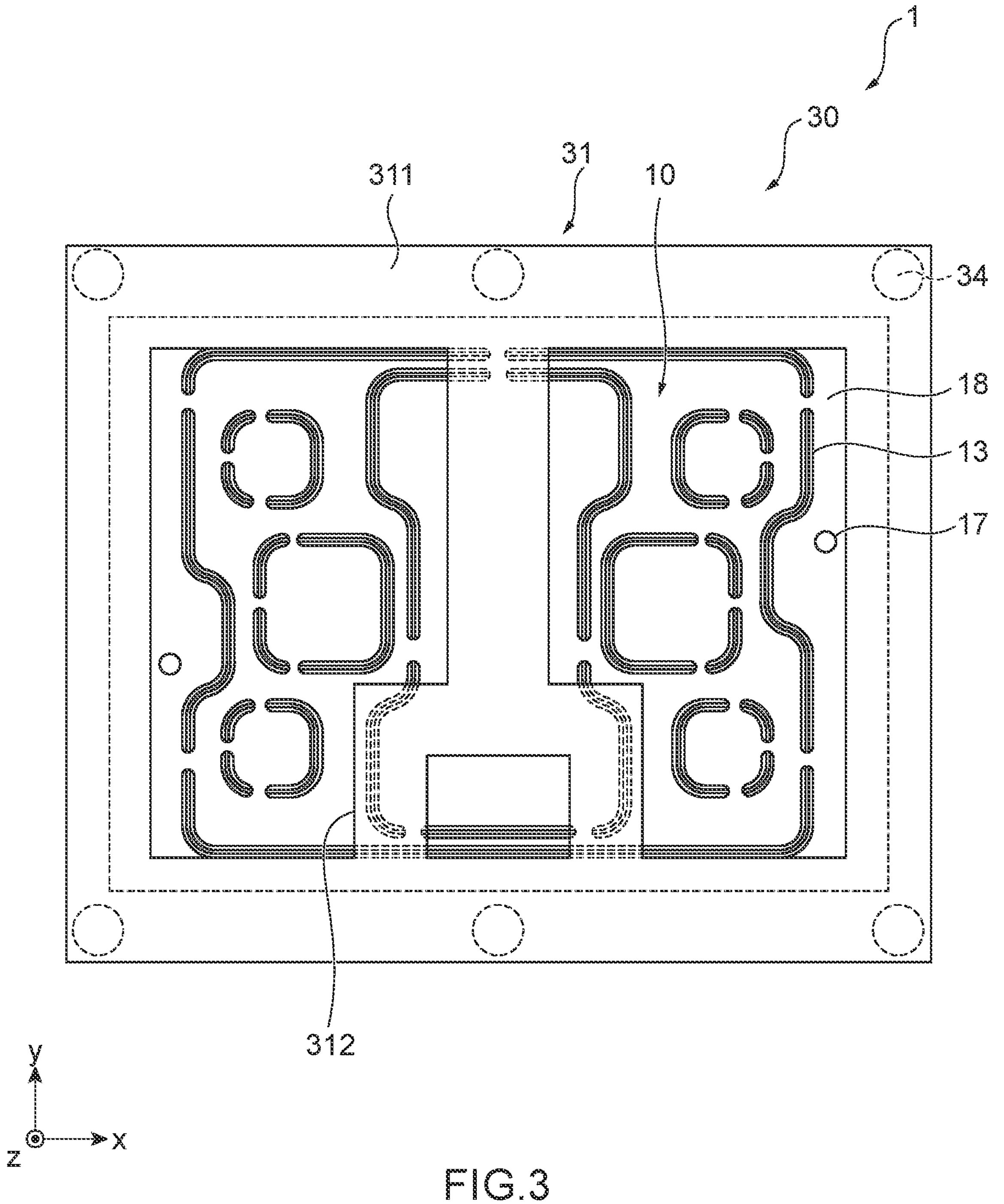
FIG. 3 A plan view for illustrating the schematic configuration of the welding jig device illustrated in FIG. 1.
Figure 4:
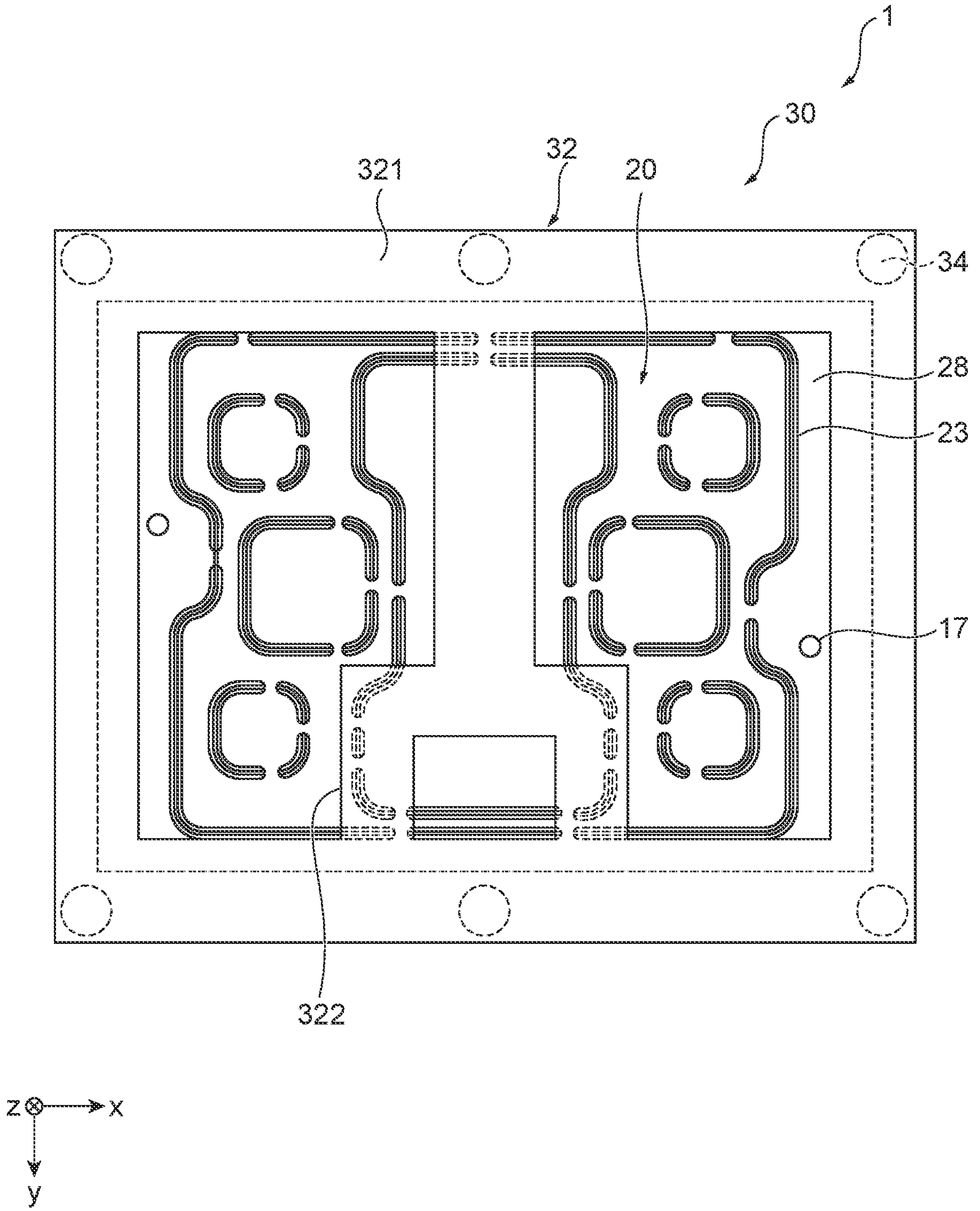
FIG. 4 A bottom view of the welding jig device illustrated in FIG. 1.
Figure 5:
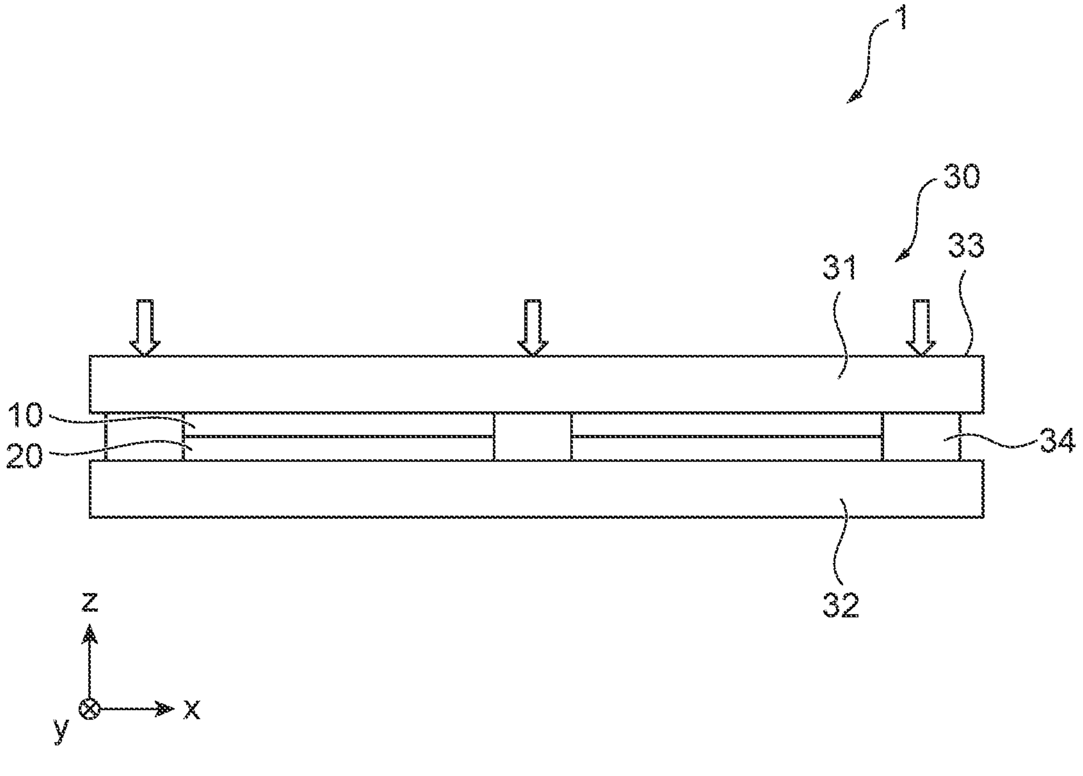
FIG. 5 A side view of the welding jig device illustrated in FIG. 1.
Figure 6:
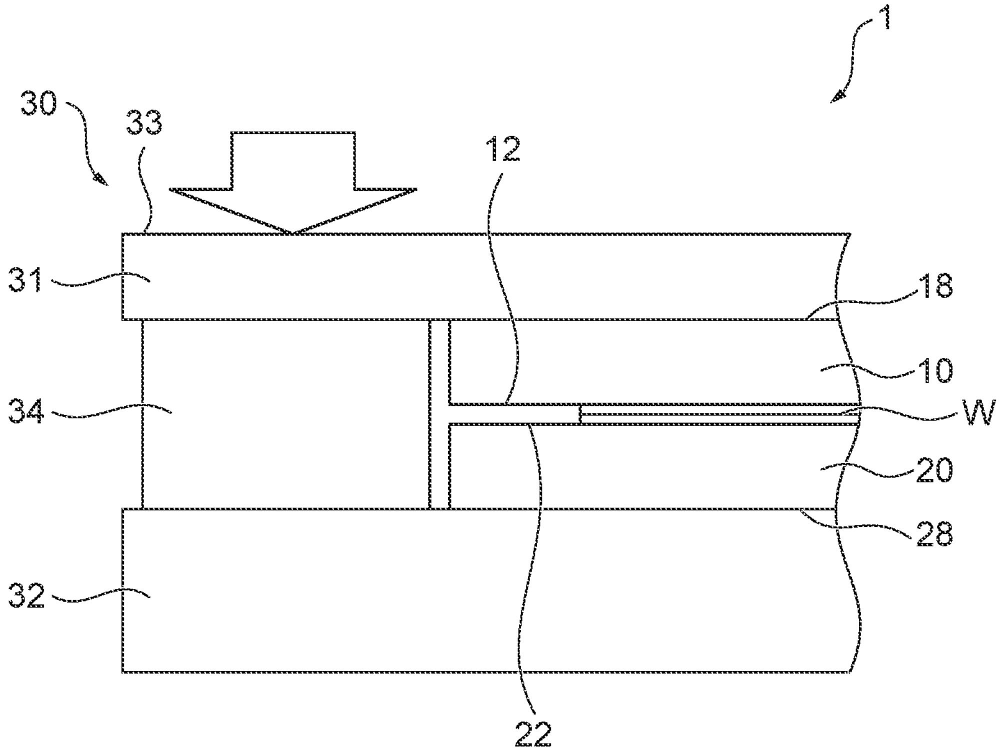
FIG. 6 An enlarged side view of the welding jig device illustrated in FIG. 5.
Figure 7:
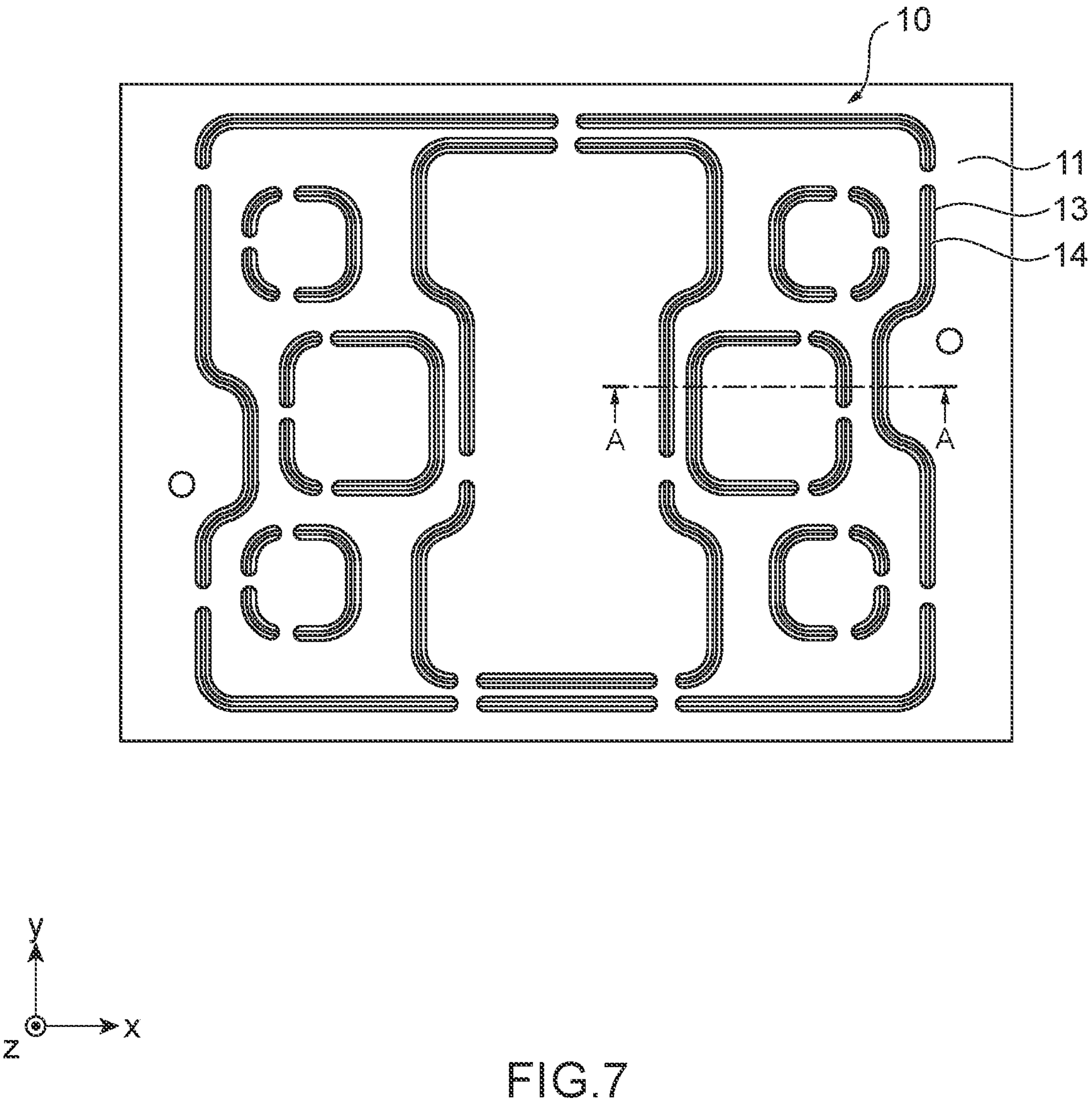
FIG. 7 A plan view of a jig on one side of the welding jig device illustrated in FIG. 1.
Figure 8:
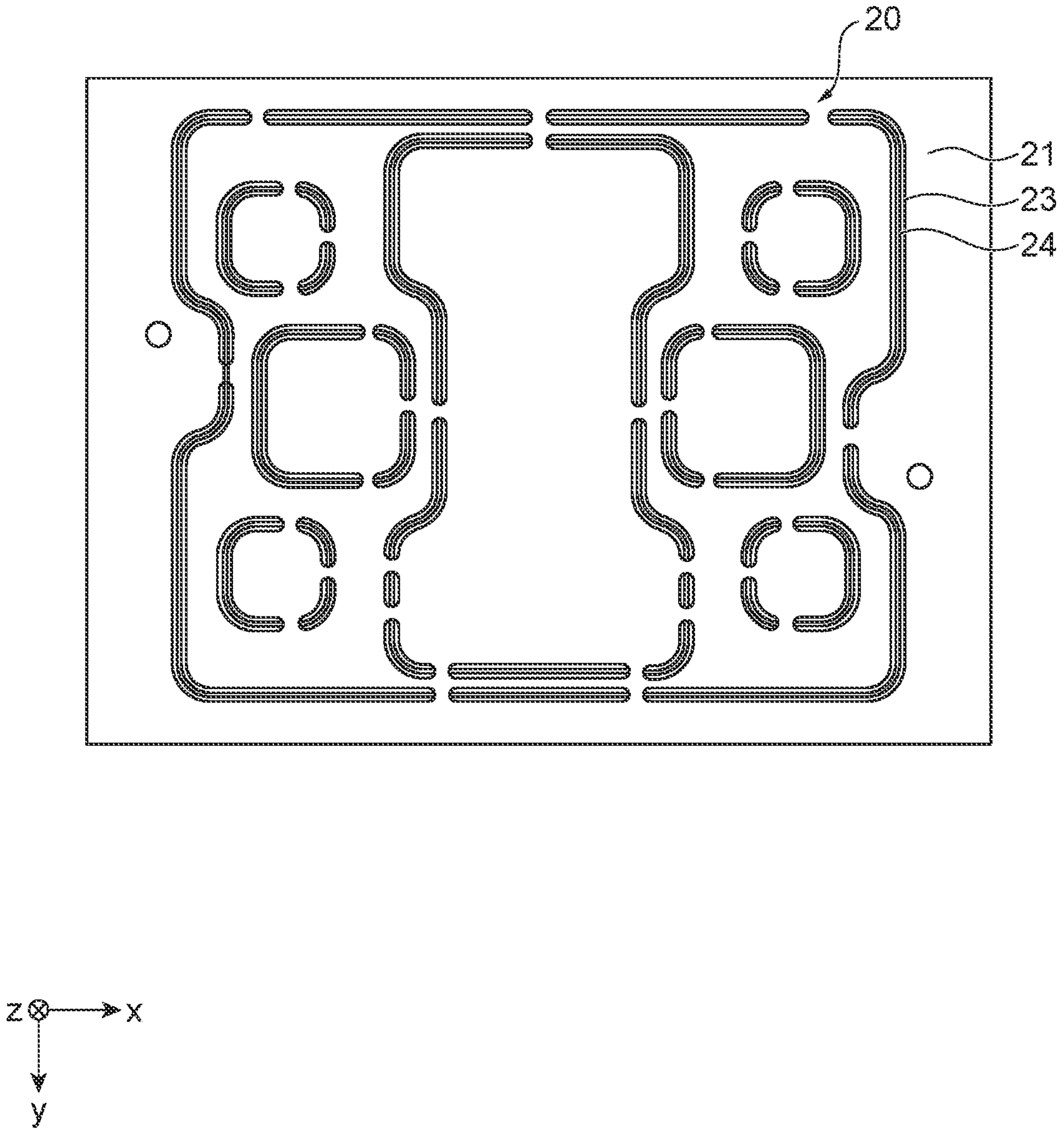
FIG. 8 A plan view of a jig on the other side of the welding jig device illustrated in FIG. 1.
Figure 9:
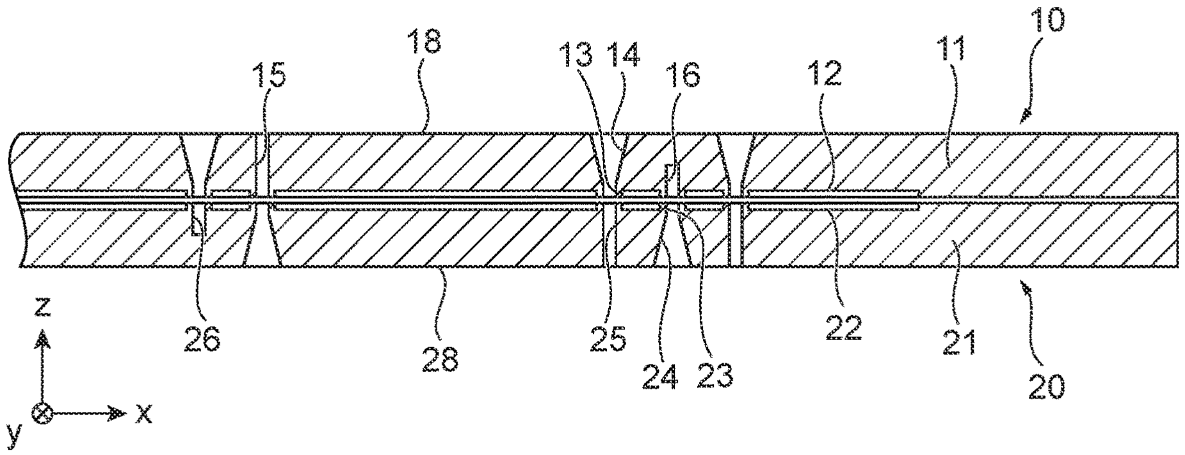
FIG. 9 An A-A cross-sectional view of the jig on one side and the jig on the other side of the welding jig device illustrated in FIG. 7.

FIG. 1 is a schematic view for illustrating the schematic configuration of a welding jig device 1 according to an embodiment of the present disclosure. FIG. 2 is an exploded perspective view for illustrating the schematic configuration of the welding jig device 1. FIG. 3 is a plan view for illustrating the schematic configuration of the welding jig device 1. FIG. 4 is a bottom view of the welding jig device 1. FIG. 5 is a side view of the welding jig device 1. FIG. 6 is an enlarged side view of the welding jig device 1. FIG. 7 is a plan view of a jig 10 on one side of the welding jig device 1. FIG. 8 is a plan view of a jig 20 on the other side of the welding jig device 1. FIG. 9 is an A-A cross-sectional view of the jig 10 on one side and the jig 20 on the other side of the welding jig device 1.

Hereinafter, for convenience sake, a direction (stacking direction) in which the jig 10 on one side and the jig 20 on the other side of the welding jig device 1 illustrated in FIGS. 3 to 5 or a plurality of members are overlaid one on top of the other is assumed as a z-axis direction. The z-axis direction is also referred to as a vertical direction. Further, in the welding jig device 1, of the directions orthogonal to the z-axis direction, a direction along longer sides of the jig 10 on one side and the jig 20 on the other side is assumed as an x-axis direction. The x-axis direction is also referred to as a right-left direction. In addition, in the welding jig device 1, of the directions orthogonal to the z-axis direction, a direction (direction orthogonal to the x-axis direction) along shorter sides of the jig 10 on one side and the jig 20 on the other side is assumed as a y-axis direction. The y-axis direction is also referred to as a front-rear direction. In the jig 10 on one side and the jig 20 on the other side, faces where the jig 10 on one side and the jig 20 on the other side face each other are back faces and the opposite faces are front faces. In FIGS. 1, 3, and 5, the front face of the jig 10 on one side faces upward. Further, in FIGS. 1, 3, and 5, the front face of the jig on the other side faces downward. In the following description, the positional relationship or direction of each component expressed as the "right side," "left side," "front side," rear side," "upper side," or "lower side" only illustrates the positional relationship or direction on the drawings, and does not limit the positional relationship or direction in the actual welding jig device.

As illustrated in FIGS. 1 to 6, the welding jig device 1 according to the embodiment of the present disclosure is used for forming a part by overlaying the plurality of members (workpieces W) one on top of the other and welding them together. The welding jig device 1 includes the jig 10 on one side, the jig 20 on the other side, and a jig clamp 30. As illustrated in FIG. 6, the jig 10 on one side includes a joint face 12 on one side to be in contact with one face of faces exposed on the outer surface sides of the plurality of workpieces W that are overlaid one on top of the other. The jig 20 on the other side includes a joint face 22 on the other side to be in contact with the other face of the faces exposed on the outer surface sides of the plurality of workpieces W. An opening (an opening 13 on one side, an opening 23 on the other side) corresponding to desired welded portions of the plurality of workpieces W is provided in at least one of the jig 10 on one side or the jig 20 on the other side. The jig clamp 30 is adapted to sandwich the jig 10 on one side and the jig 20 on the other side together with the plurality of workpieces W in the stacking direction (y-axis direction) of the plurality of workpieces W. Hereinafter, the welding jig device 1 will be specifically described.

As illustrated in FIGS. 1 to 6, the welding jig device 1 is used for producing a part 5 by joining a plurality of metal workpieces W together by welding.

Figure 10:
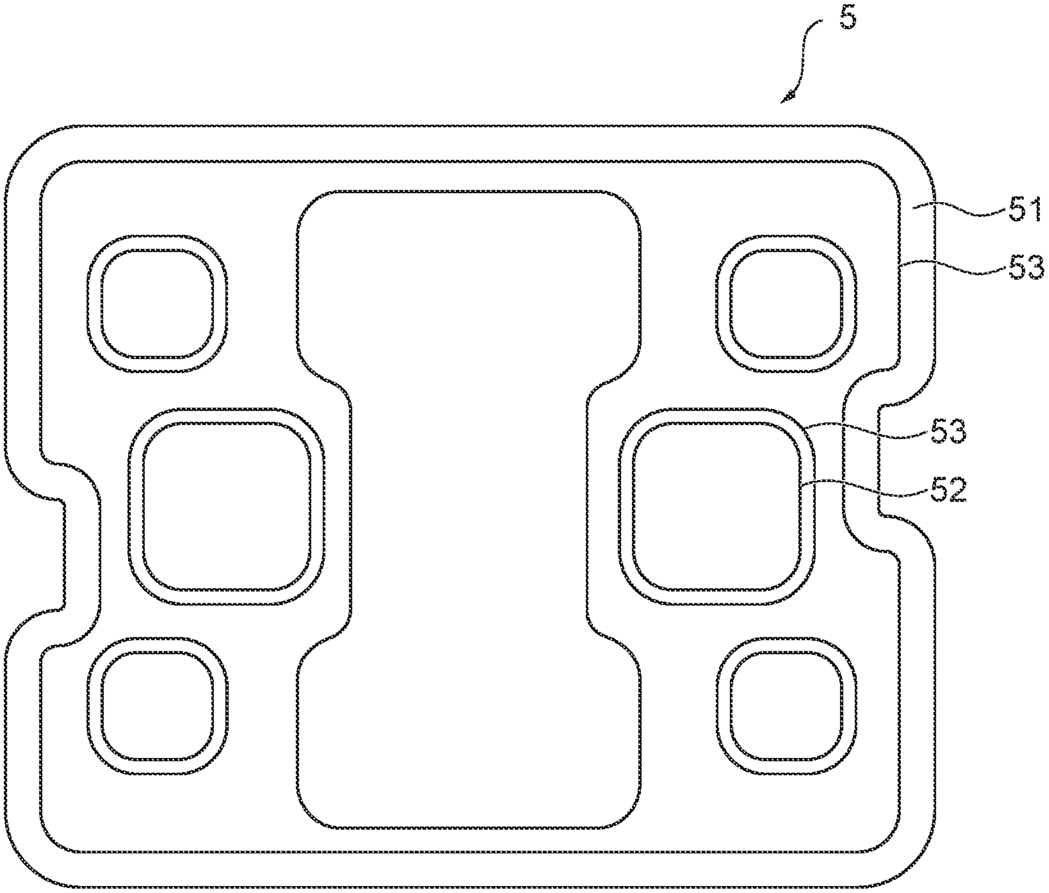
FIG. 10 A plan view for illustrating the schematic configuration of a part produced with the welding jig device illustrated in FIG. 1.

FIG. 10 is a plan view for illustrating the schematic configuration of the part 5 produced with the welding jig device 1. As illustrated in FIG. 10, the part 5 produced by joining the plurality of workpieces W with the welding jig device 1 includes a part body 51, which has been obtained by joining the workpieces W, and an opening 52 penetrating the part body 51 in its thickness direction. Further, the part 5 includes welded portions 53 that are the portions of the plurality of workpieces W joined by welding. The welded portions 53 form annular closed paths, for example.

As illustrated in FIG. 1, the laser welding machine 2 irradiates members (workpieces) that are the targets to be joined, such as the workpieces W, with a laser beam B, thereby welding the members. The laser welding machine 2 includes a YAG laser source that uses YAG (Yttrium Aluminum Garnet) as a medium. The laser welding machine 2 emits a laser beam with an output of about 500 W and a wavelength of about 1070 nm (i.e., infrared region), for example, toward the workpieces W. The laser welding machine 2 includes a laser reflecting mirror, such as a galvanometer mirror (not illustrated), as a scanning optical component for scanning the surfaces of the workpieces W with a laser beam. The scanning range of the galvanometer mirror of the laser welding machine 2 is a range of 180 mm×180 mm square on the xy plane, for example. The laser welding machine 2 is configured to be movable on the xy plane along the faces of the workpieces W by means of a drive mechanism (not illustrated) so as to be capable of irradiating the entire workpieces W with a laser beam.

It should be noted that the configuration of the welding machine 2 is not limited to that of the laser welding machine 2 described above, and can be used for methods for producing parts by welding using various welding machines. For example, the welding machine may be a carbon dioxide laser welding machine.

As described above, the welding jig device 1 includes the jig 10 on one side, the jig 20 on the other side, and the jig clamp 30.

The jig 10 on one side and the jig 20 on the other side are formed of metal or resin with excellent durability and heat resistance against infrared laser beams. As illustrated in FIG. 6, the jig 10 on one side and the jig 20 on the other side are joined such that the joint face 12 on one side and the joint face 22 on the other side face each other, and are disposed across the jig clamp 30. The jig 10 on one side and the jig 20 on the other side in the usage state hold the plurality of workpieces W, which are overlaid one on top of the other, as the targets to be welded together, between the joint face 12 on one side and the joint face 22 on the other side. As illustrated in FIGS. 3 and 4, the jig 10 on one side and the jig 20 on the other side in the usage state are provided with positioning pins 17 for engaging the jig 10 on one side with the jig 20 on the other side so as to prevent positional deviations thereof in the right-left direction and the front-rear direction.

Next, the specific structures of the jig 10 on one side and the jig 20 on the other side will be described with reference to FIGS. 7 to 9.

As illustrated in FIGS. 7 and 9, the jig 10 on one side has a shape that can cover portions other than the portions 53 to be welded of the plate-like workpieces W, together with the jig 20 on the other side. The jig 10 on one side includes a jig body 11, the joint face 12 on one side, the opening 13 on one side, an inclined plane 14 of the opening, a transmissive hole portion 15, and a transmissive portion 16.

The jig body 11 determines the approximate shape of the jig 10 on one side. The jig body 11 has an approximately plate-like shape corresponding to the shapes of the workpieces W to be welded using the jig 10 on one side. The joint face 12 on one side is formed on the jig body 11 so as to be capable of contacting the face exposed on an outer surface side of the workpieces W. The joint face 12 on one side is formed on the jig body 11 so as to be capable of facing the jig 20 on the other side. The joint face 12 on one side has an irregular shape corresponding to the shapes of the workpieces W, for example.

The opening 13 on one side is an elongated hole penetrating the jig body 11 in its thickness direction (stacking direction in the welding jig device 1, i.e., z-axis direction), that is, a region between the joint face 12 on one side (i.e., inner side) and its opposite lateral face 18 on one side (i.e., outer side). The opening 13 on one side is provided corresponding to a portion of the desired welded portions 53 of the part 5 that is to be produced by allowing the welding jig device 1 to hold the workpieces W. The opening 13 on one side is open with its diameter increasing toward the lateral face 18 on one side. In the jig body 11, the inclined plane 14 of the opening is provided around the opening 13 on one side. The inclined plane 14 of the opening is formed along a cross-section of the jig body 11 in its thickness direction as a plane with a predetermined inclination angle with respect to the z-axis. The slope of the inclined plane 14 of the opening is provided to allow a laser beam emitted from the laser welding machine 2 to easily become incident on the workpieces W via the opening 13 on one side.

The transmissive hole portion 15 and the transmissive portion 16 are provided in the jig body 11 at positions where the opening 13 on one side is not provided. That is, the transmissive hole portion 15 and the transmissive portion 16 are provided corresponding to the position of the opening 23 on the other side of the jig 20 on the other side described below among the desired welded portions 53 of a fuel cell that is to be produced by allowing the welding jig device 1 to hold the workpieces W. The transmissive hole portion 15 is an elongated hole penetrating a region between the joint face 12 on one side (i.e., inner side) and its opposite lateral face 18 on one side (i.e., outer side) in the thickness direction of the jig body 11. The transmissive portion 16 is a groove-like elongated hole with a predetermined depth from the joint face 12 on one side (i.e., inner side) to the lateral face 18 on one side along the thickness direction of the jig body 11. The transmissive hole portion 15 and the transmissive portion 16 are provided in appropriate places of the jig body 11 where the opening 13 on one side is not provided such that the transmissive hole portions 15 and the transmissive portions 16 are alternately provided. That is, as long as the transmissive hole portion 15 and the transmissive portion 16 are provided in the jig body 11 at positions where the opening 13 on one side is not provided, the positions of the transmissive hole portion 15 and the transmissive portion 16 are not limited to particular positions, nor is the area ratio between the transmissive hole portion 15 and the transmissive portion 16 limited to a particular ratio, for example. It is also possible to provide only one of the transmissive hole portion 15 or the transmissive portion 16 in the jig 10 on one side.

Next, as illustrated in FIGS. 8 and 9, the jig 20 on the other side has a shape capable of covering portions other than the portions 53 to be welded of the plate-like workpieces W, together with the jig 10 on one side. The jig 20 on the other side includes a jig body 21, the joint face 22 on the other side, the opening 23 on the other side, an inclined plane 24 of the opening, a transmissive hole portion 25, and a transmissive portion 26.

The jig body 21 determines the approximate shape of the jig 20 on the other side. As with the jig body 11, the jig body 21 has an approximately plate-like shape corresponding to the shapes of the workpieces W to be welded using the jig 20 on the other side. The joint face 22 on the other side is formed on the jig body 21 so as to be capable of contacting the face exposed on an outer surface side of the workpieces W. The joint face 22 on the other side is formed on the jig body 21 so as to be capable of facing the jig 10 on one side. The jig 20 on the other side has an irregular shape corresponding to the shapes of the workpieces W, for example.

The opening 23 on the other side is an elongated hole penetrating the jig body 21 in its thickness direction, that is, a region between the joint face 22 on the other side (i.e., inner side) and its opposite lateral face 28 on the other side (i.e., outer side). The opening 23 on the other side is provided corresponding to a portion (which is different from the opening 13 on one side of the jig 10 on one side) of the desired welded portions 53 of the part 5 that is to be produced by allowing the welding jig device 1 to hold the workpieces W. That is, the opening 23 on the other side is provided corresponding to the positions where the transmissive hole portion 15 and the transmissive portion 16 of the jig 10 on one side are provided among the desired welded portions 53 of a fuel cell that is to be produced by allowing the welding jig device 1 to hold the workpieces W. The opening 23 on the other side is open with its diameter increasing toward the lateral face 28 on the other side. In the jig body 21, the inclined plane 24 of the opening is provided around the opening 23 on the other side. The inclined plane 24 of the opening is formed along a cross-section of the jig body 21 in its thickness direction as a plane with a predetermined inclination angle with respect to the z-axis. The slope of the inclined plane 24 of the opening is provided to allow a laser beam emitted from the laser welding machine 2 to easily become incident on the workpieces W via the opening 23 on the other side.

In the welding jig device 1, openings corresponding to the entire welded portions 53 of the part 5 are formed by the opening 13 on one side of the jig 10 on one side and the opening 23 on the other side of the jig 20 on the other side. Specifically, for example, to form each annular welded portion 53 of the part 5 illustrated in FIG. 10, each of the opening 13 on one side and the opening 23 on the other side is formed such that it has half the perimeter of the annular welded portions 53 as illustrated in FIGS. 7 and 8. Performing welding through the opening 13 on one side and the opening 23 on the other side using the laser welding machine 2 allows the portions 53 to be welded, which have a complex shape such as an annular shape, to be appropriately welded to form the part 5.

The transmissive hole portion 25 and the transmissive portion 26 are provided in the jig body 21 at positions where the opening 23 on the other side is not provided. That is, the transmissive hole portion 25 and the transmissive portion 26 are provided corresponding to the position of the opening 13 on one side of the jig 10 on one side among the desired welded portions 53 of the part 5 that is to be produced by allowing the welding jig device 1 to hold the workpieces W. The transmissive hole portion 25 is an elongated hole penetrating a region between the joint face 22 on the other side (i.e., inner side) and its opposite lateral face 28 on the other side (i.e., outer side) in the thickness direction of the jig body 21. The transmissive portion 26 is a groove-like elongated hole with a predetermined depth from the joint face 22 on the other side (i.e., inner side) to the lateral face 28 on the other side along the thickness direction of the jig body 21. The transmissive hole portion 25 and the transmissive portion 26 are provided in appropriate places of the jig body 21 where the opening 23 on the other side is not provided such that the transmissive hole portions 25 and the transmissive portions 26 are alternately provided. That is, as long as the transmissive hole portion 25 and the transmissive portion 26 are provided in the jig body 21 at positions where the opening 23 on the other side is not provided, the positions of the transmissive hole portion 25 and the transmissive portion 26 are not limited to particular positions, nor is the area ratio between the transmissive hole portion 25 and the transmissive portion 26 limited to a particular ratio, for example. It is also possible to provide only one of the transmissive hole portion 25 or the transmissive portion 26 in the jig 20 on the other side.

Next, the configuration of the jig clamp 30 of the welding jig device 1 will be described.

As illustrated in FIGS. 1 to 6, the jig clamp 30 includes a clamp member 31 on one side, a clamp member 32 on the other side, pressurizing parts 33, and spacers 34.

As illustrated in FIGS. 1 and 3, the clamp member 31 on one side includes an outer periphery member 311 on one side and an inner periphery member 312 on one side.

The outer periphery member 311 on one side is a frame body in a shape corresponding to a planner shape of the jig 10 on one side so as to surround the sides on the outer periphery side of the jig 10 on one side, for example, in a rectangular or a substantially rectangular shape. The inner periphery member 312 on one side is configured to cover a portion on the inner periphery side, such as a center portion of the jig 10 on one side, from the outer side (outer surface side). That is, the inner periphery member 312 on one side contacts the lateral face 18 on one side at a position where the opening 13 on one side is not provided.

The outer periphery member 311 on one side and the inner periphery member 312 on one side are an integral member, that is, they are integrally formed using an appropriate method, such as bolt fastening, so as to function as the clamp member 31 on one side in the usage state. The outer periphery member 311 on one side and the inner periphery member 312 on one side contact the lateral face 18 on one side that is the face on the outer surface side of the jig 10 on one side as illustrated in FIG. 3.

As illustrated in FIGS. 1 and 4, the clamp member 32 on the other side includes an outer periphery member 321 on the other side and an inner periphery member 322 on the other side.

The outer periphery member 321 on the other side is a frame body in a shape corresponding to a planner shape of the jig 20 on the other side so as to surround the sides on the outer periphery side of the jig 20 on the other side, for example, in a rectangular or a substantially rectangular shape. The inner periphery member 322 on the other side is configured to cover a portion on the inner periphery side, such as a center portion of the jig 20 on the other side, from the outer side (outer surface side). The outer periphery member 321 on the other side and the inner periphery member 322 on the other side are an integral member, that is, they are integrally formed using an appropriate method, such as bolt fastening, so as to function as the clamp member 32 on the other side in the usage state.

The outer periphery member 321 on the other side and the inner periphery member 322 on the other side contact the lateral face 28 on the other side that is the face on the outer surface side of the jig 20 on the other side. That is, the inner periphery member 322 on the other side contacts the lateral face 28 on the other side at a position where the opening 23 on the other side is not provided.

As illustrated in FIGS. 1 and 5, the pressurizing parts 33 are provided on the outer periphery sides, which are positioned on the outer periphery sides in the surface direction of the plurality of workpieces W, of the clamp member 31 on one side and the clamp member 32 on the other side, specifically, in the outer periphery member 311 on one side and the outer periphery member 321 on the other side. The pressurizing parts 33 are provided at appropriate positions, such as corner portions and center portions of the longer sides of the outer periphery member 311 on one side and the outer periphery member 321 on the other side.

As illustrated in FIG. 1, the pressurizing parts 33 are provided with pressurizing devices 35, such as an air cylinder, for applying force from the outer surface side (upper side or lower side) of the jig clamp 30 in the stacking direction. With the pressurizing devices 35 provided in the pressurizing parts 33, in the jig clamp 30, the jig 10 on one side and the jig 20 on the other side are pressurized from the outer surface side toward the opposite side, for example, from the upper side toward the lower side. The jig clamp 30 is pressurized so that the jig 10 on one side and the jig 20 on the other side, which are sandwiched by the jig clamp 30, are also pressurized. Then, the jig 10 on one side and the jig 20 on the other side are pressurized so that the plurality of workpieces W sandwiched between the jig 10 on one side and the jig 20 on the other side are also pressurized with each other.

As illustrated in FIGS. 3 to 6, the spacers 34 are provided at the positions where the pressurizing parts 33 are provided in the outer periphery member 311 on one side in the surface direction (xy plane direction). Further, the spacers 34 are provided between the clamp member 31 on one side and the clamp member 32 on the other side in the stacking direction (z-axis direction). The spacers 34 have a thickness with which the gap between the clamp member 31 on one side and the clamp member 32 on the other side is kept at an appropriate distance in the stacking direction in the state of the clamp member 31 on one side and the clamp member 32 on the other side being pressurized.

[Method for Producing a Part Using the Welding Jig Device]

Next, a method for producing a part that is executed using the welding jig device 1 with the aforementioned configuration will be described.

In producing the part 5 illustrated in FIG. 10 to be formed by overlaying the plurality of workpieces W one on top of the other and welding them together, the welding jig device 1 holds the plurality of workpieces W between the jig 10 on one side and the jig 20 on the other side. The plurality of workpieces W are welded through the opening 13 on one side and the opening 23 on the other side (see FIG. 9).

First, the plurality of workpieces W, which are the targets to be welded together, are held between the joint face 12 on one side of the jig 10 on one side and the joint face 22 on the other side of the jig 20 on the other side of the welding jig device 1. The plate-like workpieces W are sandwiched between the joint face 12 on one side and the joint face 22 on the other side, so as to be fixed at positions between the jig 10 on one side and the jig 20 on the other side. The jig 10 on one side and the jig 20 on the other side are prevented from positional deviations in the right-left direction and the front-rear direction by the positioning pins 17 illustrated in FIG. 3 that engage the jig 10 on one side with the jig 20 on the other side.

In the welding jig device 1, the jig 10 on one side and the jig 20 on the other side are fixed together with the workpieces W that are welded between the jigs, by means of the jig clamp 30. As illustrated in FIG. 2, the jig clamp 30 holds the jig 10 on one side by means of the clamp member 31 on one side from the outer surface side and the jig 20 on the other side by means of the clamp member 32 on the other side from the outer surface side. Further, as illustrated in FIG. 1, the jig clamp 30 pressurizes the plurality of workpieces W, together with the jig 10 on one side and the jig 20 on the other side by means of the pressurizing parts 33, which are provided in the outer periphery member 311 on one side of the clamp member 31 on one side and the outer periphery member 321 on the other side of the clamp member 32 on the other side, via the pressurizing devices 35. The plurality of workpieces W, in the state of being held between the jig 10 on one side and the jig 20 on the other side by the jig clamp 30, are prevented from generating gaps in the stacking direction.

As illustrated in FIG. 1, the workpieces W in the state of being held between the jig 10 on one side and the jig 20 on the other side in the welding jig device 1 are irradiated with the laser beam B from the laser welding machine 2 provided above the jig 10 on one side. Specifically, in the welding jig device 1, the lateral face 18 on one side, which is the face opposite to the face provided with the joint face 12 on one side, of the jig 10 on one side faces the laser welding machine 2. Therefore, the laser beam B is transmitted through the opening 13 on one side of the jig 10 on one side in the scanning range of the aforementioned galvanometer mirror, and is then irradiated to the portions 53 to be welded on the workpieces W that are held on the inner side of the joint face 12 on one side of the jig 10 on one side. Further, the laser welding machine 2 is configured to be movable on the xy plane along the faces of the workpieces W within a predetermined movable region by a drive mechanism (not illustrated). Thus, the laser welding machine 2 can irradiate the portions 53 to be welded, which correspond to the opening 13 on one side, provided across the entire workpieces W with the laser beam B.

After welding the workpieces W with the jig 10 on one side placed on the upper side, in the welding jig device 1, the jig 10 on one side and the jig 20 on the other side are reversed while maintaining the state of the plurality of workpieces W being held. That is, in the welding jig device 1, the jig 20 on the other side is arranged such that the lateral face 28 on the other side faces toward an upper side a. In the welding jig device 1, the lateral face 28 on the other side, which is the face opposite to the face provided with the joint face 22 on the other side, of the jig 20 on the other side faces the laser welding machine 2. The workpieces W are irradiated with the laser beam B from the laser welding machine 2 provided above the jig 20 on the other side. Therefore, the laser beam B is transmitted through the opening 23 on the other side of the jig 20 on the other side in the scanning range of the aforementioned galvanometer mirror, and is then irradiated to the portions 53 to be welded on the workpieces W that are held on the inner side of the joint face 22 on the other side. Thus, the laser welding machine 2 can irradiate the portions 53 to be welded, which correspond to the opening 23 on the other side, provided across the entire workpieces W with the laser beam B.

Further, in welding the part 5, a plurality of welding jig devices 1 can be prepared for the respective plurality of workpieces W of the part 5. In this manner, the welding jig device 1 can be exchanged with respective to the laser welding machine 2, so that the productivity of the part 5 can be improved.

As described above, with the use of the welding jig device 1, the plurality of workpieces W can be tightly held in the stacking direction during welding, so that strain of the workpieces W due to contraction of the welded portions is suppressed.

Further, the welding jig device 1 is provided with the spacers 34 at the positions of the pressurizing parts 33. Specifically, the spacers 34 are provided at the positions of the pressurizing parts 33 in the surface direction (xy direction) and between the joint face 12 on one side of the jig 10 on one side and the joint face 22 on the other side of the jig 20 on the other side in the stacking direction (z-direction). With the spacers 34 provided, the welding jig device 1 can distribute, across the entire jig 10 on one side and jig 20 on the other side, the force applied to the clamp member 31 on one side and the clamp member 32 on the other side via the pressurizing parts 33.

Therefore, according to the welding jig device 1, the part 5 can be formed by joining through high-quality welding.

Figure 11:
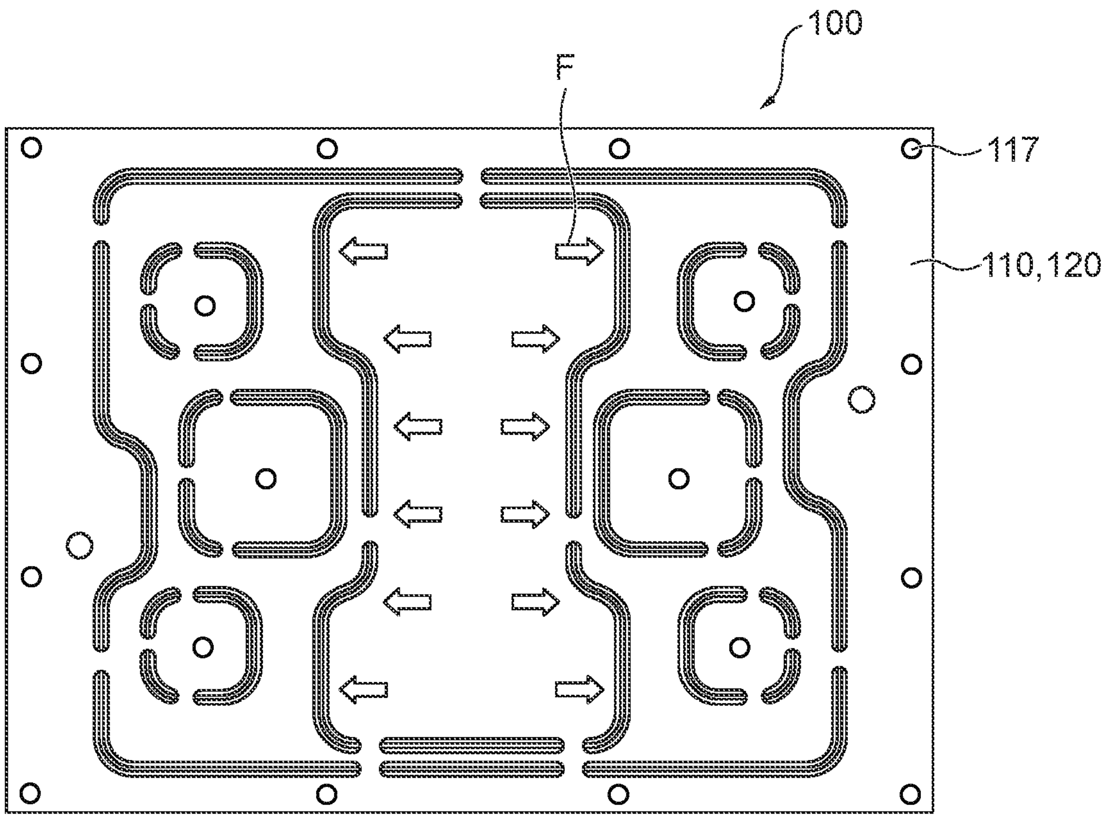
FIG. 11 A plan view for illustrating the schematic configuration of a welding jig device as a reference example.

FIG. 11 is a plan view for illustrating the schematic configuration of a welding jig device 100 as a reference example. The welding jig device 100 of the reference example illustrated in FIG. 11 differs from the welding jig device 1 in that the welding jig device 100 does not include the jig clamp 30. In the welding jig device 100 of the reference example, a jig 110 on one side and a jig 120 on the other side are fixed together by, for example, fastening bolts 117 into bolt holes (not illustrated) that are provided in the jig 120 on the other side from the jig 110 on one side.

In the welding jig device 100 of the reference example in which the jig 110 on one side and the jig 120 on the other side are fixed together as described above, there has been a case in which a force F is not sufficiently applied to the plurality of workpieces W at positions in the surface direction far from the positions where the bolts 117 are provided. Further, in the welding jig device 100, since the positions where the bolts 117 and the bolt holes can be provided are limited to mainly the outer periphery of the workpieces W or the like, there has been a case in which the force F is not sufficiently applied to the workpieces. In addition, in the welding jig device 100, since the jig 110 on one side and the jig 120 on the other side are fixed together by means of the bolts 117, the number of steps in the welding operation increases, and the improvement of productivity has been required. Furthermore, in the welding jig device 100, there has been a case in which foreign objects generated in attaching and detaching the bolts 117 cause welding defects during welding the workpieces W. Moreover, in the welding jig device 100, since the bolts 117 are attached and detached each time the welding operation is performed, the bolts 117 need to be replaced due to abrasion, and thus, the cost reduction has been required.

Meanwhile, the welding jig device 1 including the jig clamp 30 is provided with the inner periphery member 312 on one side and the inner periphery member 322 on the other side that contact the center portion, in addition to the outer periphery member 311 on one side and the outer periphery member 321 on the other side that contact the outer periphery portion of the workpieces W. Thus, the welding jig device 1 can sufficiently pressurize the plurality of workpieces W even at positions in the surface direction far from the positions where the bolts 117 are provided, such as the inner periphery side of the workpieces W. Further, since the welding jig device 1 is provided with the pressurizing parts 33 that pressurize, by means of the pressurizing devices 35, the clamp member 31 on one side and the clamp member 32 on the other side, the operation of fixing the jig 10 on one side and the jig 20 on the other side together is reduced, so that the productivity can be improved. Furthermore, since the welding jig device 1 does not use a fastening member, such as the bolt 117, welding defects due to foreign objects generated during the welding operation can be reduced. Moreover, since the welding jig device 1 pressurizes, by means of the pressurizing devices 35, the clamp member 31 on one side and the clamp member 32 on the other side, the replacement of consumables is reduced, so that the cost can be reduced.

Therefore, according to the aforementioned welding jig device 1, appropriate welding can be realized.

Although the embodiment of the present disclosure has been described above, the present disclosure is not limited to the aforementioned embodiment, and includes various aspects encompassed by the concept of the present disclosure and the scope of the claims. In addition, the aforementioned configurations may be selectively combined as appropriate so as to achieve at least a part of the aforementioned object and effects. For example, the shape, material, arrangement, size, and the like of each component of the aforementioned embodiment can be changed as appropriate depending on a specific usage pattern of the present disclosure.

For example, the workpieces W welded together with the welding jig device 1 may be members other than metal. Further, the openings are not limited to those provided in the jig body 11 of the jig 10 on one side and the jig body 21 of the jig 20 on the other side as described above, but may be provided in either one of the jig 10 on one side and the jig 20 on the other side. In this case, the openings provided in either one of the jig 10 on one side and the jig 20 on the other side correspond to the entire portions 53 to be welded.

The invention claimed is:

1. A jig device used for forming a part by stacking and welding a plurality of members together, the jig device having a first side and a second side that is opposite from the first side, the jig device comprising:

a first jig positioned on the first side of the jig device, the first jig including a first joint face on a first surface side of the first jig, the first joint face is positioned to face toward the second side of the jig device, the first joint face is configured to contact an exposed outer surface of a member of the plurality of members on the first side of the jig device, a second jig positioned on the second side of the jig device, the second jig including a second joint face on a first surface side of the second jig, the second joint face is positioned to face toward the first side of the jig device, the second joint face is configured to contact an exposed outer surface of another member of the plurality of members on the second side of the jig device, and a jig clamp adapted to sandwich the first jig on the first side of the jig device and the second jig on the second side of the jig device together with the plurality of members in a stacking direction of the plurality of members, wherein a first opening corresponding to a first desired welded portion of the part is provided in the first jig, wherein the first opening penetrates through the first jig in a thickness direction, wherein the second jig has a transmissive aperture at a first portion of the second joint face that is aligned with the first opening in a horizontal direction with respect to the first joint face of the first jig, wherein the first opening is provided on the first jig at a second surface side of the first jig, wherein a second opening corresponding to a second desired welded portion is provided at a second surface side of the second jig, wherein the second surface side of the first jig is opposite from the first surface side of the first jig, wherein the second surface side of the second jig is opposite from the first surface side of the second jig, and wherein the second opening is positioned in a second portion of the second jig not corresponding to the first opening and the transmissive aperture.

2. The jig device according to claim 1, wherein the jig clamp comprises:

a clamp member on the first side of the jig device that contacts a first outer face on the second surface side of the first jig; and a clamp member on the second side of the jig device that contacts a second outer face on the second surface side of the second jig.

3. The jig device according to claim 1, wherein the jig clamp comprises pressurizing parts, the pressurizing parts are provided on an outer periphery side of the plurality of members in a surface direction, the pressurizing parts are configured to pressurize the first jig from the second surface side of the first jig and the second jig from the second surface side of the second jig.

4. The jig device according to claim 3, wherein spacers are provided at positions of the pressurizing parts in the surface direction and between the first jig and the second jig in the stacking direction of the plurality of members.

5. The jig device according to claim 1, wherein the first desired welded portion and the second desired welded portion that are formed through the first opening and the second opening, respectively, form annular closed paths.

6. The jig device according to claim 1, wherein the jig clamp contacts the second surface side of the first jig at a position that does not overlap with the first opening, and wherein the jig clamp contacts the second surface side of the second jig at another position that does not overlap with the second opening.

* * * * *